United States Patent
Narayanan et al.

(10) Patent No.: US 11,238,448 B1
(45) Date of Patent: Feb. 1, 2022

(54) EFFICIENT NETWORK SERVICE PROVISIONING

(71) Applicant: Equinix, Inc., Redwood City, CA (US)

(72) Inventors: Sreekanth Narayanan, Singapore (SG); Danjue Li, Dublin, CA (US); Imam Sheikh, Redwood City, CA (US); Chen Xi, Singapore (SG)

(73) Assignee: Equinix, Inc., Redwood City, CA (US)

( * ) Notice: Subject to any disclaimer, the term of this patent is extended or adjusted under 35 U.S.C. 154(b) by 68 days.

(21) Appl. No.: 16/361,091

(22) Filed: Mar. 21, 2019

(51) Int. Cl.
| | |
|---|---|
| G06Q 40/00 | (2012.01) |
| G06Q 20/38 | (2012.01) |
| H04L 29/08 | (2006.01) |
| G06Q 20/12 | (2012.01) |
| G06Q 20/40 | (2012.01) |
| G06Q 20/06 | (2012.01) |

(52) U.S. Cl.
CPC ....... *G06Q 20/389* (2013.01); *G06Q 20/0658* (2013.01); *G06Q 20/127* (2013.01); *G06Q 20/40* (2013.01); *H04L 67/16* (2013.01); *H04L 67/32* (2013.01); *G06Q 2220/00* (2013.01)

(58) Field of Classification Search
CPC ............ G06Q 20/389; G06Q 20/0658; G06Q 20/127; G06Q 20/40; H04L 67/16; H04L 67/32
See application file for complete search history.

(56) References Cited

U.S. PATENT DOCUMENTS

| | | | | |
|---|---|---|---|---|
| 5,594,739 A | * | 1/1997 | Lemieux | H04J 3/0641 |
| | | | | 370/350 |
| 8,484,355 B1 | | 7/2013 | Lochhead et al. | |
| 10,721,060 B1 | * | 7/2020 | Kaizer | H04L 9/30 |
| 2004/0186905 A1 | | 9/2004 | Young et al. | |
| 2007/0069005 A1 | * | 3/2007 | Dickerson | G06Q 20/40 |
| | | | | 235/379 |

(Continued)

FOREIGN PATENT DOCUMENTS

JP 2013516005 A 5/2013

OTHER PUBLICATIONS

"Internet Routing Registry (IRR)," ARIN, retrieved from https://www.arin.net/resources/manage/irr/ on Dec. 5, 2019, 4 pp.

(Continued)

*Primary Examiner* — Rajesh Khattar
(74) *Attorney, Agent, or Firm* — Shumaker & Sieffert, P.A.

(57) ABSTRACT

This disclosure describes techniques that include use of a distributed ledger to arrange for and/or initiate provisioning of network services, and also to validate payment for such network services. In one example, this disclosure describes a method that includes modifying, by a computing system, a distributed ledger maintained by a consensus network to implement a smart contract that is configured to generate, in response to receiving a request for network services, a provisioning request; receiving the provisioning request, by the computing system and from a computing device on the consensus network that is executing the smart contract, wherein the provisioning request includes information describing requested network services; and provisioning, by the computing system and based on the information describing the requested network services, network services.

17 Claims, 4 Drawing Sheets

(56) References Cited

U.S. PATENT DOCUMENTS

| | | | | |
|---|---|---|---|---|
| 2011/0153684 A1* | 6/2011 | Yung | ................... | G06F 9/45533 |
| | | | | 707/805 |
| 2013/0339203 A1* | 12/2013 | Dias de Assuncao | ....................... | |
| | | | | H04L 67/1097 |
| | | | | 705/35 |
| 2017/0331907 A1* | 11/2017 | Jagannath | ............... | H04L 43/16 |
| 2019/0014124 A1* | 1/2019 | Reddy | .................. | H04L 63/108 |
| 2019/0333031 A1* | 10/2019 | Kravitz | ................ | G06Q 20/401 |
| 2019/0379544 A1* | 12/2019 | Suthar | ..................... | H04L 63/08 |
| 2020/0136932 A1* | 4/2020 | Jangam | .................. | H04L 45/64 |

OTHER PUBLICATIONS

Reed et al., "Decentralized Identifiers (DIDs) v1.0," https://w3c.github.io/did-core/, Dec. 10, 2019, 59 pp.

* cited by examiner

EFFICIENT NETWORK SERVICE PROVISIONING

TECHNICAL FIELD

This disclosure relates to computer networks, and more specifically, to provisioning resources in a network or data center.

BACKGROUND

Cloud computing refers to the use of dynamically scalable computing resources accessible via a network, such as the internet. The computing resources, often referred to as a "cloud," provide one or more services to users. These services may be categorized according to service types, which may include applications/software, platforms, infrastructure, virtualization, computing resources, and/or data storage. A network services exchange provider, a data center, or a co-location provider (a "services provider") may deploy a data center in which multiple customers of the service provider locate network, server, and storage gear and interconnect to a variety of telecommunications and other network service provider(s) with a minimum of cost and complexity. In some situations, a network services exchange provider may provide data center resources as a cloud-based service, and such resources may be shared by multiple tenants locating networking, computing, and storage equipment within the data centers. Network services exchange providers, or service providers generally, typically implement some form of service provisioning procedure, in which exchange and/or cloud customers arrange and/or contract with service providers for the online delivery of services provided by the exchange, the cloud, the data center, and/or other network resources.

SUMMARY

This disclosure describes techniques that include use of a distributed ledger to arrange for and/or initiate provisioning of network services, and also to validate payment for such network services. In some examples, such techniques may involve a smart contract configured to accept a request for network services and associated payment, verify payment, and if payment is verified, cause one or more systems to provision the requested services.

Techniques in accordance with one or more aspects of the present disclosure may enable a services provider to more efficiently and seamlessly contract with customers to provide services, and as a result, more efficiently provision appropriate services on behalf of customers. In some examples, such techniques may reduce the number of customer interactions that may otherwise be necessary or desired when onboarding a new customer and arranging for a new set of network services to be provided to that customer.

Further, in some examples, a computing system may assist in selecting one or more of a number of service providers that might be appropriate for, or properly equipped for, providing services to a new or even existing customer. In such an example, a computing system may implement a process for selecting from among multiple service providers, and such a process may be based on the network services requested by the customer and/or the expected cost of the services. Such a process may be implemented as a reverse-bidding arrangement based on cost. Such a process may also be based on other criteria, including available payment methods, service level agreements offered by various service providers, ratings, historical performance, and/or any combination of these or other criteria.

In one example, this disclosure describes a method comprising modifying, by a computing system, a distributed ledger maintained by a consensus network to implement a smart contract that is configured to generate, in response to receiving a request for network services, a provisioning request; receiving the provisioning request, by the computing system and from a computing device on the consensus network that is executing the smart contract, wherein the provisioning request includes information describing requested network services; provisioning, by the computing system and based on the information describing the requested network services, network services; generating, by the computing system, authorization credentials to be presented in order to use the network services; and enabling, by the computing system, use of the network services for a user that presents the authorization credentials.

In another example, this disclosure describes a system comprising a storage device; and processing circuitry having access to the storage device and configured to: modify a distributed ledger maintained by a consensus network to implement a smart contract that is configured to generate, in response to receiving a request for network services, a provisioning request, receive the provisioning request, from a computing device on the consensus network that is executing the smart contract, wherein the provisioning request includes information describing requested network services, provision, based on the information describing the requested network services, network services, generate authorization credentials to be presented in order to use the network services, and enable use of the network services for a user that presents the authorization credentials.

In another example, this disclosure describes a computer-readable storage medium comprises instructions that, when executed, configure processing circuitry of a computing system to modify a distributed ledger maintained by a consensus network to implement a smart contract that is configured to generate, in response to receiving a request for network services, a provisioning request; receive the provisioning request, from a computing device on the consensus network that is executing the smart contract, wherein the provisioning request includes information describing requested network services; provision, based on the information describing the requested network services, network services; generate authorization credentials to be presented in order to use the network services; and enable use of the network services for a user that presents the authorization credentials.

DETAILED DESCRIPTION

Figure 1A:
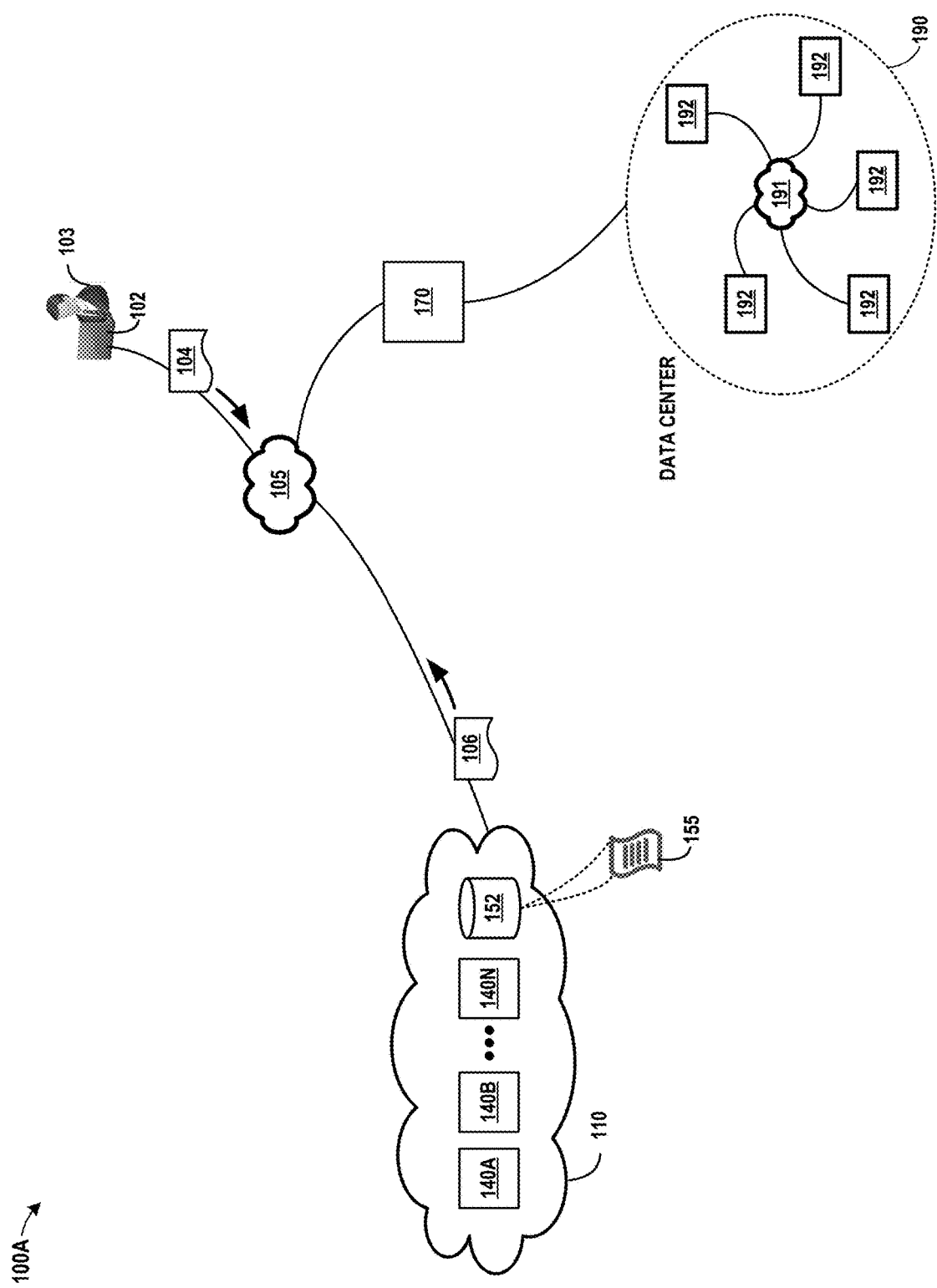
FIG. 1A and FIG. 1B are conceptual diagrams illustrating systems in which network resources are provisioned and enabled, in accordance with one or more aspects of the present disclosure.

Data center resources are increasingly provisioned in a dynamic manner, and software-defined configurations may begin to be applied in new ways to many data center operations, enabling data centers to provision, consume, and monetize data center resources in new ways. Aspects of data center provisioning are automated, but some aspects of customer onboarding, provisioning, and monetization of data center resources are not. Smart contracts implemented on distributed ledgers may make it possible to remove or reduce time-consuming and/or inefficient end-user interactions in onboarding, provisioning, and/or monetization processes. For example, smart contracts, cryptographically signed by a data center provider to enable end-users to authenticate the service-provider entity associated with the smart contract, can be used to register and/or onboard new users (i.e., new customers), provision services, and/or collect payment from end users for those services in an efficient manner. Such a solution can be applied to a number of varied services, including providing pre-packaged data center cages, cabinets, and/or power draw modules, virtual and/or preinstalled networking equipment, and computing resources that serve as function-as-a-service code execution containers. In some examples, a smart contract could serve as, or could invoke, an aggregation service that facilitates access to services from one (or more) of a selected one of a number of different data center and/or colocation providers. In some examples, such an aggregation service might conduct a reverse bidding procedure, enabling such providers to compete for the opportunity to provide data center and/or colocation services for a user.

In one example, a data center resources provider may publish a smart contract codified to provision and allow access to data center resources for a specified period of time. The smart contract may be published on a public block chain network on for the purpose of provisioning services for that data center resources provider, or in some examples, may be published for the purpose of providing services from a consortium of different colocation providers. A user seeking data center services may review and/or interact with the smart contract to verify the publisher of the smart contract, and to determine the terms of use of the services provided pursuant to the smart contract. If the user wishes to contract for services, the user may interact with the smart contract to pay for the services with a cryptocurrency accepted by the smart contract, and in response, the smart contract may validate the payment and provision the specified data center services for a specified amount of time. For example, a pre-provisioned data center cage having various resources may be released or made available to the user for a specific period of time with power and cooling enabled, and with a suitable access control mechanism like a unique hash code for initial access being enabled automatically. In some examples, the smart contract may rely on other services (e.g., located in a data center) to accomplish the provisioning of resources. Also, in some examples, monetization is achieved by the cryptocurrency-based payment received by the smart contract.

In examples involving a consortium of service providers, automated bidding between different service providers based on the smallest list price for the requested services may be used to select a service provider to provide services to the user. In such an example, a smart contract may select a service provider based on a number of factors beyond cost, including past performance, offered service level agreements, or the like.

Figure 1B:
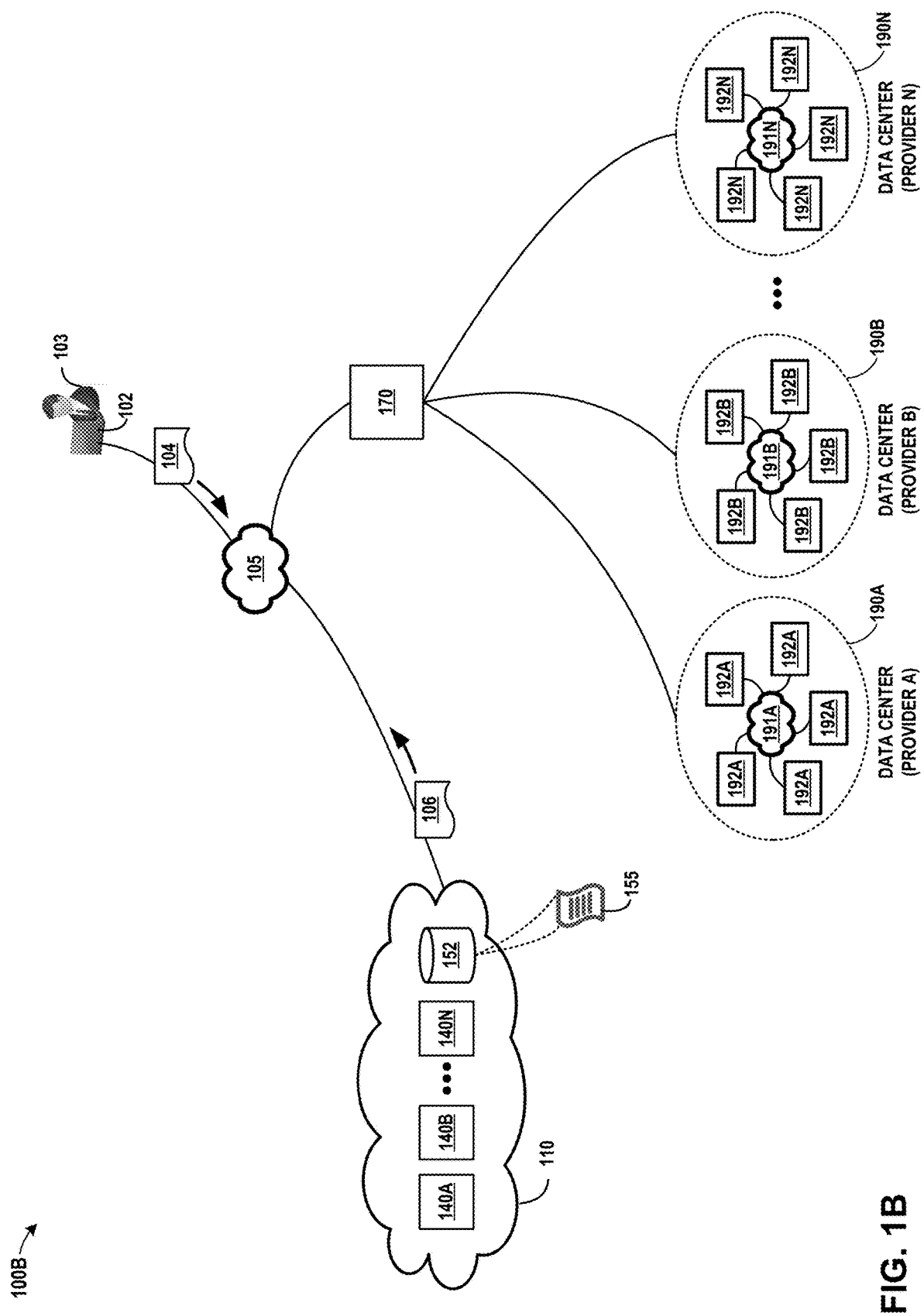

FIG. 1A and FIG. 1B are conceptual diagrams illustrating systems in which network resources are provisioned and enabled, in accordance with one or more aspects of the present disclosure. In the example of FIG. 1A, system 100A includes consensus network 110, client device 102 (operated by user 103), computing system 170, and data center 190 connected through network 105. FIG. 1B is similar, except that FIG. 1B includes more than one data center, including data center 190A through 190N (collectively "data centers 190," and representing any number of data centers). In both FIG. 1A and FIG. 1B, client device 102 may generate transaction request 104, which may be communicated to consensus network 110 over network 105. One or more transaction requests 104 may generate provisioning request 106 from within consensus network 110, and provisioning request 106 may be communicated to computing system 170 over network 105.

In the examples shown in FIG. 1A and FIG. 1B, consensus network 110 includes a plurality of nodes, including node 140A through 140N (collectively "nodes 140," and representing any number of nodes). Consensus network 110 may include one or more distributed ledgers, including distributed ledger 152, which may be implemented as a data store included in multiple (or all) nodes 140 within consensus network 110. In general, each node 140 within consensus network 110 (or a significant fraction of nodes 140) includes a copy (or at least a partial copy) of distributed ledger 152 maintained by consensus network 110.

Data center 190 of FIG. 1A and each of data centers 190 of FIG. 1B include various data center resources 192. For example, data center 190 of FIG. 1A includes multiple data center resources 192. Similarly, data center 190A of FIG. 1B includes multiple data center resources 192A, and in general, data center 190N of FIG. 1B includes multiple data center resources 192N (where "data center resources 192N" represents any number of data center resources). Each of data center resources 192 may correspond to any suitable computing device that may typically be found in a data center. One or more of data center resources 192 may alternatively be implemented as a network or data center device, and may include one or more network hubs, network switches, network routers, satellite dishes, or any other network equipment. Such devices or components (data center resources 192, generally) may be operatively intercoupled, such as through data center networks 191, thereby providing for the exchange of information between computers, devices, or other components (e.g., between one or more client devices or systems and one or more server devices or systems).

Typically, consensus network 110 is implemented as a network of computing devices (e.g., "nodes 140") that collectively implement one or more distributed ledgers 152. Nodes 140 included within consensus network 110 may each represent any computing device capable of adhering to a consensus protocol and/or performing operations corresponding to one or more smart contracts 155 or smart contract module (e.g., a module that executes source code associated with smart contract 155). One or more consensus networks 110 may, for instance, represent an Ethereum network of Ethereum virtual machines (EVMs), also known as an Ethereum blockchain platform, executing on hardware computing devices. Other similar virtual machines may be employed on other blockchain platforms.

Distributed ledger 152 included within consensus network 110 may represent one or more shared transactional databases or data stores that include a plurality of blocks, each block (other than the root) referencing at least one block created at an earlier time, each block bundling one or more transactions registered within distributed ledger 152, and each block cryptographically secured. Consensus network 110 may receive transactions from transaction senders (e.g., computing devices external or internal to consensus network 110) that invoke functionality of distributed ledger 152 (or of smart contract 155) to modify distributed ledger 152 stored within and maintained by consensus network 110. Consensus network 110 may use distributed ledger 152 for verification. Each block of distributed ledger 152 contains a hash pointer as a link to a previous block, a timestamp, and the transaction data for the transactions. In a blockchain implementation, and by design, distributed ledger 152 is inherently resistant to modification of previously-stored transaction data. Functionally, distributed ledger 152 serves as a ledger, distributed across many nodes of a consensus network, that can record transactions (and other information, generally) between parties efficiently and in a verifiable and permanent way. Since distributed ledger 152 is a distributed ledger, each of nodes 140 within consensus network 110 (or at least a significant fraction of nodes 140) store a copy of distributed ledger 152.

Consensus network 110 may be a peer-to-peer network that manages distributed ledger 152 by collectively adhering to a protocol for validating new blocks. Once recorded, the data in any given block of distributed ledger 152 cannot be altered retroactively without the alteration of all subsequent blocks and a collusion of at least some (e.g., typically a majority) of nodes 140 of consensus network 110. For instance, the data in a block within distributed ledger 152 cannot be altered retroactively without also altering all subsequent blocks and without agreement of a majority of nodes 140 of consensus network 110.

Smart contract 155 within nodes 140 of consensus networks 110 may represent instructions, rules, or executable code implemented as a so-called "blockchain smart contract." For instance, smart contract 155 may represent an executable script or program for performing a transaction for a party, or between parties, to modify state of distributed ledger 152. In examples of consensus networks that are Ethereum networks, smart contract 155 may represent one or more autonomous scripts or one or more stateful decentralized applications that are stored in an Ethereum distributed ledger 152 for later execution by the nodes of consensus network 110. Smart contract 155 may reside in one or more blocks of distributed ledger 152, and may be considered part of distributed ledger 152.

Since each of nodes 140 within consensus network 110 (or at least a significant fraction of nodes 140) store a copy of distributed ledger 152, each of nodes 140 may include a copy of smart contract 155. Accordingly, smart contract 155 may be included within each of nodes 140 in FIG. 1A or FIG. 1B as an identical copy of the data, script, and/or code implementing a smart contract.

For ease of illustration in FIG. 1A and FIG. 1B, one consensus network 110 is illustrated, and within consensus network 110, one distributed ledger 152 is illustrated, but multiple consensus networks 110 may be included within some implementations, and multiple distributed ledgers 152 might be included or implemented by one or more consensus networks 110 in a manner consistent with the techniques described herein. For example, consensus network 110 may manage multiple distributed ledgers 152. Further, each of distributed ledgers 152 might be a private distributed ledger or a public distributed ledger. Further, one network 105, one computing system 170, and a limited number of data centers 190 are shown within FIG. 1A and FIG. 1B and/or in other illustrations referenced herein. However, techniques in accordance with one or more aspects of the present disclosure may be performed with many more of such systems, components, devices, modules, and/or other items, and individual or collective references to such systems, components, devices, modules, and/or other items may be understood to represent references to any number of such systems, components, devices, modules, and/or other items.

In FIG. 1A, and in accordance with one or more aspects of the present disclosure, consensus network 110 may modify a distributed network to include smart contract 155. For instance, in an example that can be described with reference to FIG. 1A, computing system 170 outputs a signal over network 105. One or more of nodes 140 (e.g., node 140A) detect a signal and determine that the signal includes information to implement smart contract 155 within distributed ledger 152. Node 140A may communicate with other nodes 140 on consensus network 110 pursuant to a consensus protocol, and cause (or initiate a process that causes) each of nodes 140 to update distributed ledger 152 by nodes 140 within consensus network 110 to include smart contract 155. Once some or all of nodes 140 determine that the updates to distributed ledger 152 are valid, smart contract 155 is included within distributed ledger 152 maintained by consensus network 110. Accordingly, one or more nodes 140 may include a copy of smart contract 155, and thereafter, smart contract 155 executes across nodes 140 within consensus network 110. As further described below, when smart contract 155 executes across nodes 140 within consensus network 110, smart contract 155 may respond to transaction requests, and smart contract 155 may modify distributed ledger 152 maintained within consensus network 110 in the manner specified by smart contract 155.

Consensus network 110 may receive a request to provision data center services. For instance, in the example of FIG. 1A, client device 102 detects input and outputs a signal over network 105. One or more of nodes 140 detect a signal over network 105 and determine that the signal corresponds to transaction request 104 intended for processing by smart contract 155. In some examples, transaction request 104 specifies a set of data center services that a user of a computing device (e.g., client device 102) seeks to provision and deploy. In some examples, transaction request 104 may include information specifying that transaction request 104 originated from client device 102, operated by user 103. One or more of nodes 140 present transaction request 104 for processing by a local copy of smart contract 155, executing at one or more of nodes 140. One or more copies of smart contract 155, executing on at least some of nodes 140, process transaction request 104, and determine that transaction request 104 corresponds to a valid request to provision data center resources included within or associated with data center 190. Smart contract 155 may further determine that the transaction request includes an indication of payment and a description of the specific data center resources to be used.

Consensus network 110 may communicate with computing system 170. For instance, still referring to FIG. 1A, one or more nodes 140, in response to receiving transaction request 104 and verifying that it is to be processed by smart contract 155, process transaction request 104 pursuant to smart contract 155 and as a result, output a signal over network 105. Computing system 170 detects a signal, and determines that the signal corresponds to provisioning request 106, from smart contract 155, to perform one or more operations originally specified by transaction request 104. Computing system 170 further determines that provisioning request 106 includes information about data center services specified by transaction request 104 and payment for such services. Computing system 170 verifies availability of data center resources and verifies payment (if not already verified by smart contract 155). To determine availability of resources within data center 190, computing system 170 may interact with one or more systems included within data center 190 to determine availability, or may access a directory of available resources. Such a directory of available resources may be included within data center 190, or in other examples, some or all portions of such a directory may be outside of data center 190. In some examples, payment for services is made through a cryptocurrency, so in some examples, computing system 170 (or smart contract 155) verifies payment by verifying, based on one or more distributed ledgers associated with the cryptocurrency, that payment credentials included within transaction request 104 indicate that the indicated cryptocurrency identified by transaction request 104 is owned by the operator of user 103 and/or sender of transaction request 104 (e.g., client device 102). In some examples, some or all of these operations may be performed by smart contract 155, rather than computing system 170.

Computing system 170 may provision data center services. For instance, again referring to FIG. 1A, computing system 170 outputs a signal to data center 190, and onto data center network 191. One or more systems (e.g., data center resources 192) included within data center 190 detect a signal over data center network 191 and determine that the signal includes a valid request to provision resources. One or more systems within data center 190 determine the resources being requested, and allocate appropriate data center resources 192 based on provisioning request 106. In some examples, such resources may include data center resources such as pre-packaged cages, cabinets, and/or power draw modules, virtual or physical networking equipment, virtual or physical preinstalled networking equipment, one or more network functions as a service code virtual machines or execution containers, and/or various power draw modules. Also, in some examples, such resources may be provisioned for a limited, specific, and/or predetermined time period. Such a time period may be explicitly requested within transaction request 104 (and communicated to computing system 170, such as through provisioning request 106), or may be determined based on the payment processed and verified by computing system 170. Once provisioned, data center resources 192 within data center 190 may perform operations originally specified by transaction request 104. Such operations may be performed on behalf of client device 102 or for the benefit of user 103. As described, such operations may include providing network and/or computing functions supported by power and infrastructure from data center resources 192 included within data center 190.

In FIG. 1B, and in accordance with one or more aspects of the present disclosure, computing system 170 may aggregate services and identify one or more service providers to fulfill provisioning request 106. For instance, in an example that can be described with reference to FIG. 1B, client device 102 detects input and outputs a signal over network 105. One or more of nodes 140 detect a signal over network 105 and determine that the signal corresponds to transaction request 104 for processing by smart contract 155. Smart contract 155 within at least some of nodes 140 processes transaction request 104, and determines that transaction request 104 includes a request to provision and use data center resources included within or associated with one or more data centers 190. At least one of nodes 140, operating pursuant to smart contract 155, outputs a signal over network 105 that is detected by computing system 170. Computing system 170 determines that the signal corresponds to provisioning request 106, which may be a request, by smart contract 155, to provision a set of data center resources within one or more of data centers 190, each administered by one or more separate providers A through N.

In the example of FIG. 1B, computing system 170 serves as a mediator aggregating services provided by multiple providers, each operating respective data centers 190A through 190N. Computing system 170 may conduct a reverse bidding procedure by soliciting bids from each of providers A through N, and automatically identifying, based on responses of such providers, a selected provider and associate data center 190. In such an example, computing system 170 may solicit bids and receive responses from each of data centers 190 (associated with providers A through N) in an automated fashion, so that neither computing system 170 nor any of data centers 190 require significant or any human or administrator input. Computing system 170 may alternatively access a local or remote data store of services available through each of data centers 190 and associated pricing information, and determine, based on information stored in the data store, an appropriate one (or more) of providers A through N to furnish services specified by provisioning request 106.

In some examples, computing system 170 may identify one or more service providers to fulfill provisioning request 106, based on cost, or based on other criteria. Such other criteria may include ratings and/or historical performance of at least some of such service providers, service level agreements offered by such service providers, available payment methods (e.g., types of cryptocurrency accepted as payment), and/or any combination of these or other criteria.

Computing system 170 may cause one or more data centers 190 to provide services specified by provisioning request 106. For instance, still referring to FIG. 1B, and in one example, computing system 170 determines that data center 190A most appropriately satisfies the criteria for selecting from among data centers 190 for providing services specified by provisioning request 106. Computing system 170 outputs one or more signals to data center 190A. One or more systems within data center 190A detect signals, and in response, provision the services and corresponding data center resources 192A specified by provisioning request 106. Data center resources 192A thereafter provide data center services consistent with provisioning request 106 on behalf of user 103 operating client device 102.

Through techniques in accordance with one or more aspects of the present disclosure, such as by provisioning network services through a smart contract, system 100A and/or system 100B may more efficiently provision network services. Since provisioning network services using techniques described herein can be performed automatically, system 100A and/or system 100B may require less user input and less input processing, particularly with respect to customer onboarding and/or payment processing and verification. As a result, aspects of this disclosure may improve the function of a computing system (e.g., computing system 170) because techniques described herein may have the effect of causing computing system 170 to operate more efficiently.

Further, by provisioning network services through a smart contract, system 100 may require less user input and/or less user input processing, and thereby consume less electrical power because processing user input consumes electrical power. Therefore, aspects of this disclosure may improve the function of system 100 because provisioning network services through a smart contract may have the effect of causing system 100 to consume less electrical power.

Figure 2:
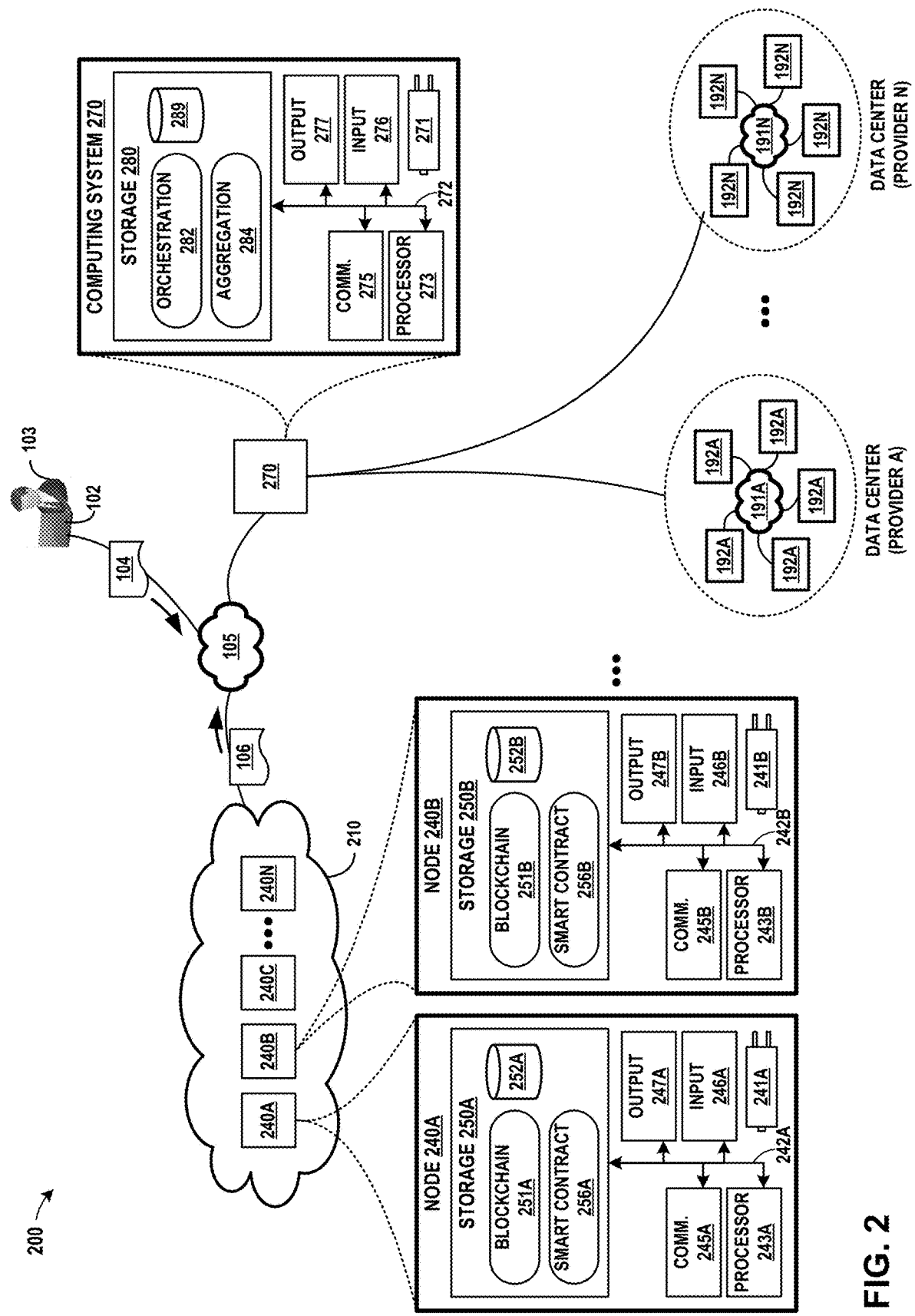
FIG. 2 is a block diagram illustrating an example system in which network resources are provisioned using a consensus network, in accordance with one or more aspects of the present disclosure.

FIG. 2 is a block diagram illustrating an example system in which network resources are provisioned using a consensus network, in accordance with one or more aspects of the present disclosure. System 200 of FIG. 2 may be described as an example or alternative implementation of system 100A of FIG. 1A or system 100B of FIG. 1B. One or more aspects of FIG. 2 may be described herein within the context of FIG. 1A and/or FIG. 1B.

In the example of FIG. 2, system 200 includes consensus network 210, client device 102, and computing system 270, all connected through network 105. In the example shown, system 200 also includes a plurality of data centers, including data center 190A through 190N (collectively "data centers 190," and representing any number of data centers). Each of data centers 190 includes one or more data center networks 191 (e.g., data center 190A includes data center network 191A, and in general, data center 190N includes data center network 191N). Further, each of data centers 190 includes various data center resources 192 (e.g., data center 190A includes multiple data center resources 192A, and in general, data center 190N includes data center resource 192N).

Each of data centers 190, data center networks 191, and data center resources 192 may correspond to like-numbered data center elements of FIG. 1A and FIG. 1B. As described in connection with FIG. 1A and FIG. 1B, each of data center resources 192 may correspond to any type of computing device, and/or network or data center device. Such devices or components may be operatively inter-coupled, such as through data center networks 191, thereby providing for the exchange of information between computers, devices, or other components (e.g., between one or more client devices or systems and one or more server devices or systems).

In FIG. 2, client device 102 may be operated by user 103. Consensus network 210 may correspond to consensus network 110 of FIG. 1A and FIG. 1B, and computing system 270 may correspond to computing system 170 of FIG. 1A and FIG. 1B. Client device 102 may generate transaction request 104 based on input from user 103, and network 105 may communicate transaction request 104 to consensus network 210. Nodes 240 within consensus network 210 may generate provisioning request 106 and network 105 may communicate provisioning request 106 to computing system 270. For ease of illustration, one consensus network 210 and one computing system 270 is shown in FIG. 2, although techniques in accordance with one or more aspects of the present disclosure may be performed with multiple consensus networks and/or multiple computing systems.

Also, each of nodes 240 (collectively "nodes 240," and representing any number of nodes) shown within consensus network 210 of FIG. 2 may generally correspond to nodes 140 included within consensus network 110 of FIG. 1A and FIG. 1B. These devices, systems, and/or components may be implemented in a manner consistent with the description of the corresponding system provided in connection with FIG. 1A and FIG. 1B, although in some examples, such systems may involve alternative implementations with more, fewer, and/or different capabilities. In general, systems, devices, components, and other items illustrated in FIG. 2 may correspond to like-numbered systems, devices, components, and items illustrated in FIG. 1A and FIG. 1B, and may be described in a manner consistent with the description provided in connection with FIG. 1A and/or FIG. 1B.

Any or all of network 105, consensus network 210, and/or any of data center networks 191 may be the internet or may include, be a part of, and/or represent any public or private communications network or other network. For instance, network 105, consensus network 210, and/or data center networks 191 may each be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across the networks illustrated in FIG. 2 using any suitable communication techniques. Network 105, consensus network 210, and any of data center networks 191 (or data centers 190) may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to the networks shown in FIG. 2 using one or more network links. The links coupling such devices or systems may be Ethernet or other types of network connections, and such connections may be wireless and/or wired connections. One or more of the devices or systems illustrated in FIG. 2 or otherwise illustrated on network 105, consensus network 210, or data center networks 191 may be in a remote location relative to one or more other illustrated devices or systems.

Client device 102 may be implemented as any suitable client computing system, such as a mobile, non-mobile, wearable, and/or non-wearable computing device. Client device 102 may represent a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure.

Each of nodes 240A through 240N (shown within consensus network 210) may be implemented as any suitable computing system, such as one or more server computers, workstations, mainframes, appliances, cloud computing systems, and/or other computing systems that may be capable of performing operations and/or functions described in accordance with one or more aspects of the present disclosure. One or more of nodes 240 may, in some examples, represent a cloud computing system, server farm, and/or server cluster (or portion thereof) that provides services to client devices and other devices or systems. In other examples, nodes 240 may represent or be implemented through one or more virtualized compute instances (e.g., virtual machines, containers) of a data center, cloud computing system, server farm, and/or server cluster. For instance, any or all of nodes 240 may be implemented as Ethereum virtual machines.

In the example of FIG. 2, node 240A, for example, may include power source 241A, one or more processors 243A, one or more communication units 245A, one or more input devices 246A, one or more output devices 247A, and one or more storage devices 250A. Storage devices 250A may include blockchain module 251A, ledger data store 252A, and smart contract module 256A. One or more of the devices, modules, storage areas, or other components of node 240A may be interconnected to enable inter-component communications (physically, communicatively, and/or operatively). In some examples, such connectivity may be provided by through communication channels (e.g., communication channels 242A), a system bus, a network connection, an inter-process communication data structure, or any other method for communicating data.

Similarly, node 240B may include power source 241B, one or more processors 243B, one or more communication units 245B, one or more input devices 246B, one or more output devices 247B, and one or more storage devices 250B. Storage devices 250B may include blockchain module 251B, ledger data store 252B, and smart contract module 256B. As in node 240A, one or more of the devices, modules, storage areas, or other components of node 240B may be interconnected to enable inter-component communications (physically, communicatively, and/or operatively). Also as in node 240A, such connectivity may be provided by through a system bus (e.g., communication channels 242B), a network connection, an inter-process communication data structure, or any other method for communicating data. In general, any given "node 240N" may include components that correspond to those illustrated with respect to node 240A and node 240B.

In this disclosure, processors 243A through 243N may be collectively referred to as "processors 243." Communication units 245A through 245N may be collectively referred to as "communication units 245." As used herein generally, "N" is any number such that "processors 243" represents any number of processors 243 and "communication units 245" represents any number of communication units 245. Correspondingly, for other components, devices, or modules that are illustrated or described using a similar numbering and letter convention, such components, devices, or modules may be referred to collectively in a similar fashion. In some examples, and as may be noted, one or more nodes 240 may include more or fewer capabilities, features, components, and/or functionality than other nodes 240. For certain nodes 240, one or more components, devices, or modules shown in FIG. 2 as being included within one or more nodes 240 may be optional. For instance, although each of nodes 240 is shown with ledger data stores 252 in FIG. 2, in some examples one or more of nodes 240 might not include ledger data store 252, or might include a partial copy of ledger data store 252.

Certain aspects of nodes 240 are described below with respect to node 240A. Other nodes 240 (e.g., node 240B through node 240N) could be described similarly, and thus may also include the same, similar, or corresponding components, devices, modules, functionality, and/or other features. Descriptions herein with respect to node 240A may therefore correspondingly apply to one or more other nodes 240 (e.g., node 240B through node 240N). For example, the description of processor 243A of node 240A may also apply to processor 243B of node 240B.

Power source 241A of node 240A may provide power to one or more components of node 240A. Power source 241A may receive power from the primary alternating current (AC) power supply in a building, home, or other location. In other examples, power source 241A may be a battery or a device that supplies direct current (DC). In still further examples, node 240A and/or power source 241A may receive power from another source. One or more of the devices or components illustrated within node 240A may be connected to power source 241A, and/or may receive power from power source 241A. Power source 241A may have intelligent power management or consumption capabilities, and such features may be controlled, accessed, or adjusted by one or more modules of node 240A and/or by one or more processors 243A to intelligently consume, allocate, supply, or otherwise manage power.

One or more processors 243A of node 240A may implement functionality and/or execute instructions associated with node 240A or associated with one or more modules illustrated herein and/or described below. One or more processors 243A may be, may be part of, and/or may include processing circuitry that performs operations in accordance with one or more aspects of the present disclosure. Examples of processors 243A include microprocessors, application processors, display controllers, auxiliary processors, one or more sensor hubs, and any other hardware configured to function as a processor, a processing unit, or a processing device. Node 240A may use one or more processors 243A to perform operations in accordance with one or more aspects of the present disclosure using software, hardware, firmware, or a mixture of hardware, software, and firmware residing in and/or executing at node 240A.

One or more communication units 245A of node 240A may communicate with devices external to node 240A by transmitting and/or receiving data, and may operate, in some respects, as both an input device and an output device. In some examples, communication unit 245A may communicate with other devices over a network. In other examples, communication units 245A may send and/or receive radio signals on a radio network such as a cellular radio network. In other examples, communication units 245A of node 240A may transmit and/or receive satellite signals on a satellite network such as a Global Positioning System (GPS) network. Examples of communication units 245A include a network interface card (e.g. such as an Ethernet card), an optical transceiver, a radio frequency transceiver, a GPS receiver, or any other type of device that can send and/or receive information. Other examples of communication units 245A may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246A may represent any input devices of node 240A not otherwise separately described herein. One or more input devices 246A may generate, receive, and/or process input from any type of device capable of detecting input from a human or machine. For example, one or more input devices 246A may generate, receive, and/or process input in the form of electrical, physical, audio, image, and/or visual input (e.g., peripheral device, keyboard, microphone, camera).

One or more output devices 247A may represent any output devices of node 240A not otherwise separately described herein. One or more output devices 247A may generate, receive, and/or process input from any type of device capable of detecting input from a human or machine. For example, one or more output devices 247A may generate, receive, and/or process output in the form of electrical and/or physical output (e.g., peripheral device, actuator).

One or more storage devices 250A within node 240A may store information for processing during operation of node 240A. Storage devices 250A may store program instructions and/or data associated with one or more of the modules described in accordance with one or more aspects of this disclosure. One or more processors 243A and one or more storage devices 250A may provide an operating environment or platform for such modules, which may be implemented as software, but may in some examples include any combination of hardware, firmware, and software. One or more processors 243A may execute instructions and one or more storage devices 250A may store instructions and/or data of one or more modules. The combination of processors 243A and storage devices 250A may retrieve, store, and/or execute the instructions and/or data of one or more applications, modules, or software. Processors 243A and/or storage devices 250A may also be operably coupled to one or more other software and/or hardware components, including, but not limited to, one or more of the components of node 240A and/or one or more devices or systems illustrated as being connected to node 240A.

In some examples, one or more storage devices 250A are temporary memories, meaning that a primary purpose of the one or more storage devices is not long-term storage. Storage devices 250A of node 240A may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250A, in some examples, also include one or more computer-readable storage media. Storage devices 250A may be configured to store larger amounts of information than volatile memory. Storage devices 250A may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Blockchain module 251A may perform functions relating to adhering to protocols and/or procedures of a consensus network. Blockchain module 251A may cause communication unit 245A to communicate with one or more nodes 240 within consensus network 210 pursuant to a consensus algorithm or blockchain protocol to cause other nodes 240 to update a distributed ledger maintained by a plurality of nodes 240 within consensus network 210. Blockchain module 251A may update its own ledger data store 252A, and verify that ledger data store 252A is consistent with other ledger data stores 252 included across consensus network 210. Blockchain module 251A may output information to smart contract module 256A. Blockchain module 251A may follow a consensus protocol to verify the validity of the instructions to modify ledger data store 252A. Blockchain module 251A may implement one or more blockchain services of a distributed computing platform. Blockchain module 251 may, for example, implement services of an Ethereum computing platform or one or more Hyperledger-based blockchains or related tools. Although blockchain module 251A may be described in connection with FIG. 2 as primarily performing operations relating to consensus networks, blockchain module 251A may alternatively, or in addition, perform other operations. In some examples, functions performed by blockchain module 251A could be performed by software or by a hardware device executing software. In other examples, functions performed by blockchain module 251A may be implemented primarily or partially through hardware.

Ledger data store 252A may represent any suitable data structure or storage medium for storing information in a distributed ledger shared or commonly maintained across consensus network 210. The information stored in ledger data store 252A may be searchable and/or categorized such that one or more modules within node 240A may provide an input requesting information from ledger data store 252A, and in response to the input, receive information stored within ledger data store 252A. Each of nodes 240 within consensus network 210 may collectively maintain ledger data stores 252 included within nodes 240, and thereby maintain a distributed ledger (made up of ledger data stores 252 stored across nodes 240 of consensus network 210) according to consensus network or blockchain protocols used within consensus network 210. Ledger data store 252A may be primarily maintained by blockchain module 251A. Ledger data store 252A may provide other modules with access to the data stored within ledger data store 252A, and/or may analyze the data stored within ledger data store 252A and output such information on behalf of other modules of node 240A.

Smart contract module 256A may perform functions relating to receiving one or more transaction requests 104 from one or more client devices 102, and in response, may cause modifications or updates to ledger data store 252A. Such modifications and/or updates may be performed in a manner consistent with carrying out the provisions or terms of a smart contract maintained by consensus network 210. Further, smart contract module 256A may respond to receiving one or more transaction requests 104 by outputting one or more provisioning requests 106 to be processed by computing system 270 as described herein. Smart contract module 256A may receive information from and output information to one or more other modules, and may otherwise interact with and/or operate in conjunction with one or more other modules of node 240A. Although smart contract module 256A may be described in connection with FIG. 2 as primarily responding to one or more transaction requests 104 and generating one or more provisioning requests 106, smart contract module 256A may alternatively, or in addition, perform other operations.

One or more computing systems 270 may, in some examples, serve an orchestrator for provisioning and/or enabling use of network services and/or data center services. Computing system 270 might not be part of consensus network 210 or any of data centers 190, but may provide services and/or functionality independently of consensus network 210 and/or consensus network 110. In other examples, all or a portion of the functionality described herein as being furnished by computing system 270 may be provided by one or more systems included within consensus network 210 and/or one or more of data centers 190. Accordingly, although computing system 270 is illustrated as a single system in the example of FIG. 2, computing system 270 may be implemented through multiple systems and/or as a distributed system spanning multiple locations. Computing system 270 may also, when providing services, interact with consensus network 210 to instantiate and/or configure a smart contract stored within one or more distributed ledgers implemented on consensus network 210.

As with each of nodes 240, computing system 270 be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 270 may represent a cloud computing system, server farm, and/or server cluster (or portion thereof) that responds to one or more provisioning requests 106 received from consensus network 210 and/or provides services to client devices and other devices or systems. In other examples, computing system 270 may represent or be implemented through one or more virtualized compute instances (e.g., virtual machines, containers) of a data center, cloud computing system, server farm, and/or server cluster.

In the example of FIG. 2, computing system 270 may include power source 271, one or more processors 273, one or more communication units 275, one or more input devices 276, one or more output devices 277, and one or more storage devices 280. Storage devices 280 may include orchestration module 282, aggregation module 284 (e.g., as software stored on device 280), and data store 289. One or more of the devices, modules, storage areas, or other components of computing system 270 may be interconnected to enable inter-component communications (physically, communicatively, and/or operatively). In some examples, such connectivity may be provided by through communication channels (e.g., communication channels 272), a system bus, a network connection, an inter-process communication data structure, or any other method for communicating data.

In the example illustrated in FIG. 2, various components of computing system 270 could be described and/or implemented in a manner similar to corresponding components of one or more nodes 240. For instance, power source 271 may be described and/or implemented in a manner similar to the description of power source 241A of node 240A. Similarly, communication channels 272 may be described and/or implemented in a manner similar to the description of communication channels 242A of node 240A. Processor 273 may be described and/or implemented in a manner similar to the description of processor 243A of node 240A. Communication unit 275 may be described and/or implemented in a manner similar to the description of communication unit 245A of node 240A. Input device 276 may be described and/or implemented in a manner similar to the description of input device 246A of node 240A. Output device 277 may be described and/or implemented in a manner similar to the description of output device 247A of node 240A. And storage device 280 may be described and/or implemented in a manner similar to the description of storage device 250A of node 240A. Accordingly, descriptions of power source 271, communication channels 272, processor 273, communication unit 275, input device 276, and output device 277 are not repeated here, although it should be understood that in some examples, one or more of power source 271, communication channels 272, processor 273, communication unit 275, input device 276, and/or output device 277 may be implemented in a manner similar to (or differently) than that described in connection with node 240A.

Orchestration module 282 may perform functions relating to causing one or more service providers to provision network services. Orchestration module 282 may interact with aggregation module 284 to identify a network service provider, and based on such interactions, may communicate with the identified network service provider to provision services in response to a provisioning request. Although orchestration module 282 may be described in connection with FIG. 2 as primarily orchestrating the provision of network services, orchestration module 282 may alternatively, or in addition, perform other functions, such as causing one or more distributed ledgers to implement a smart contract to provision network services or cause the provisioning of network services.

Aggregation module 284 may perform functions relating to performing an aggregation analysis to identify one or more service providers that may provide services in response to provisioning request 106. Aggregation module 284 may, in some examples, evaluate services provided by data centers 190 using an automated reverse bidding process that determines a set of services that meet specification of transaction request 104, and the cost of the set of services for each provider. Aggregation module 284 may identify one or more service providers that are suitable to provision the requested services based on cost, or based on other criteria, including ratings and/or historical performance of each of such service providers, service level agreements offered by such service providers, available payment methods (e.g., types of cryptocurrency accepted as payment), and/or any combination of these or other criteria. In some examples, aggregation module 284 may access information within data store 289 to determine cost information, performance, or rating information, or information about historical performance of one or more data centers 190.

Data store 289 may represent any suitable data structure or storage medium for storing information related to storing information about data centers 190, including capabilities, ratings, and historical performance of various aspects of data centers 190, or other information. In some examples, data store 289 may be accessed by aggregation module 284 to determine cost information, performance, or rating information, or information about historical performance of one or more data centers 190. The information stored in data store 289 may be searchable and/or categorized such that one or more modules within computing system 270 may provide an input requesting information from data store 289, and in response to the input, receive information stored within data store 289. Data store 289 may be primarily maintained by aggregation module 284. Data store 289 may provide other modules with access to the data stored within data store 289, and/or may analyze the data stored within data store 289 and output such information on behalf of other modules of computing system 270.

In the example of FIG. 2, in accordance with one or more aspects of the present disclosure, one or more of nodes 240 may receive a request to provide data center services. For instance, in an example that can be described with reference to FIG. 2, client device 102 (operated by user 103) detects input and outputs, over network 105, transaction request 104. Network 105 communicates transaction request 104 over consensus network 210 to one or more of nodes 240. Communication unit 245A of node 240A, for example, detects a signal over network 105 from within consensus network 210. Communication unit 245A outputs an indication of the signal to blockchain module 251A. Blockchain module 251A determines that the signal includes information intended for processing by a smart contract included within a distributed ledger maintained by consensus networks 210. In the example of FIG. 2, the smart contract is represented by smart contract module 256A of node 240A, and may be based on or correspond to data stored within ledger data store 252A of node 240A. Accordingly, blockchain module 251A outputs information to smart contract module 256A. Smart contract module 256A determines that the information corresponds to a request to commission services offered by one or more service providers (e.g., provider A through N in FIG. 2) operating and/or administering corresponding data centers 190A through 190N.

Consensus network 210 may update a distributed ledger to reflect receipt of transaction request 104. For instance, still referring to FIG. 2, smart contract module 256A modifies ledger data store 252A to include a proposed modification of a distributed ledger maintained by nodes 240 to include information associated with transaction request 104, and to reflect payment for services specified by transaction request 104. Blockchain module 251A causes communication unit 245A to output a signal over consensus network 210. Each of nodes 240 (or a significant fraction of nodes 240) within consensus network 210 detect a signal over consensus network 210. In one such example, communication unit 245B of node 240B detects a signal over consensus network 210. Communication unit 245B outputs an indication of the signal to blockchain module 251B. Blockchain module 251B determines that the signal includes instructions to modify ledger data store 252B to reflect the proposed modification based on the information associated with transaction request 104. Blockchain module 251B of node 240B follows a consensus protocol to verify the validity of the proposed modification to ledger data store 252B received over consensus network 210. Similarly, other nodes 240 within consensus network 210 (e.g., nodes 240C through 240N, not shown) may also follow the consensus protocol associated with consensus network 210 to verify the validity of the proposed modification, received from one or more other nodes 240 within consensus network 210, to update each respective ledger data store 252 to include information derived from transaction request 104. Eventually, each of nodes 240 (or a majority of nodes 240) within consensus network 210 determine that proposed modifications to each of ledger data stores 252 (which collectively correspond to a distributed ledger maintained by consensus network 210) can be verified as a valid part of each of ledger data stores 252.

One or more of nodes 240 may communicate with computing system 270 to request that data center services be provisioned. For instance, still referring to FIG. 2, smart contract module 256A causes communication unit 245A to output a signal over network 105. Communication unit 275 of computing system 270 detects a signal and outputs to orchestration module 282 information about the signal. In one example, orchestration module 282 determines that the signal corresponds to provisioning request 106, which may include a request to orchestrate and/or provision data center services from a specific service provider (e.g., "service provider A" administering and/or operating data center 190A). In such an example, orchestration module 282 causes communication unit 275 to communicate one or more signals, or a series of signals, to one or more systems within data center 190A. In response, one or more systems within data center 190A (i.e., data center resources 192A on data center network 191A) detect the signals and provision network services consistent with provisioning request 106. Thereafter, systems, resources, and/or infrastructure within data center 190A provide services consistent those specified in provisioning request 106 for the period of time specified by provisioning request 106.

In another example, orchestration module 282 may determine that provisioning request 106 corresponds to a request to aggregate services from one or more of data centers 190 (administered by providers A through N). In such an example, orchestration module 282 outputs information to aggregation module 284 to initiate aggregation analysis to identify one or more service providers that may provide services in response to provisioning request 106. To aggregate such services, aggregation module 284 may, in some examples, evaluate services provided by data centers 190 using an automated reverse bidding system that determines a set of services that meet the specifications of provisioning request 106, and the cost of the set of services for each provider. Aggregation module 284 may identify one or more service providers that are suitable to provision the requested set of services based on cost, or based on other criteria, including ratings and/or historical performance of each of such service providers, service level agreements offered by such service providers, available payment methods (e.g., types of cryptocurrency accepted as payment), and/or any combination of these or other criteria. In some examples, aggregation module 284 may access information within data store 289 to determine cost information, performance, or rating information, or information about historical performance of one or more data centers 190.

Computing system 270 may cause one or more of service providers to provision services in one or more data centers 190. For instance, again referring to FIG. 2, and in one example, aggregation module 284 selects a service provider (e.g., service provider N, operating data center 190N) based on provisioning request 106 and appropriate criteria. After selecting service provider N, aggregation module 284 and outputs information identifying service provider N to orchestration module 282. Orchestration module 282 causes communication unit 275 to output a signal to one or more systems within data center 190N, causing data center 190N to provision and/or enable services consistent with provisioning request 106.

Computing system 170 may further cause consensus network 210 to update a distributed ledger to reflect the services provided by one or more of data centers 190. For instance, in some examples, and in connection with provisioning services within data center 190N, orchestration module 282 may cause communication unit 275 to output a signal over network 105. One or more of nodes 240 may detect the signal. Communication unit 245A of node 240A, for example, may detect the signal and output an indication of the signal to blockchain module 251A. Blockchain module 251A determines that the signal includes information intended for processing by smart contract module 256A, and outputs information to smart contract module 256A. Smart contract module 256A modifies ledger data store 252A to include a proposed modification of the distributed ledger maintained by consensus network 210 to reflect the provisioning of the services by one or more of data centers 190 (i.e., in the example described, data center 190N) in response to provisioning request 106.

Nodes 240 may verify the proposed modification to the distributed ledger maintained by consensus network 210. For instance, after modifying ledger data store 252A, smart contract module 256A causes communication unit 245A to output a signal over consensus network 210. Each of nodes 240 (or a significant fraction of nodes 240) within consensus network 210 detect a signal over consensus network 210. Some or all of the other nodes 240 within consensus network 210 follow a consensus protocol associated with consensus network 210 to verify the validity of the proposed modification, received from one or more other nodes 240 within consensus network 210, to update each respective ledger data store 252 to include information reflecting the provisioning of the services by data center 190N. Eventually, each of nodes 240 (or a majority of nodes 240) within consensus network 210 determine that proposed modifications to each of ledger data stores 252 (which collectively correspond to a distributed ledger maintained by consensus network 210) can be verified and are a valid part of each of ledger data stores 252.

Modules illustrated in FIG. 2 (e.g., blockchain modules 251, smart contract modules 256, orchestration module 282, aggregation module 284) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or preinstalled application or "app." In other examples, each module, data store, component, program, executable, data item, functional unit, or other item illustrated within a storage device may be implemented as part of an operating system executed on a computing device.

Figure 3:
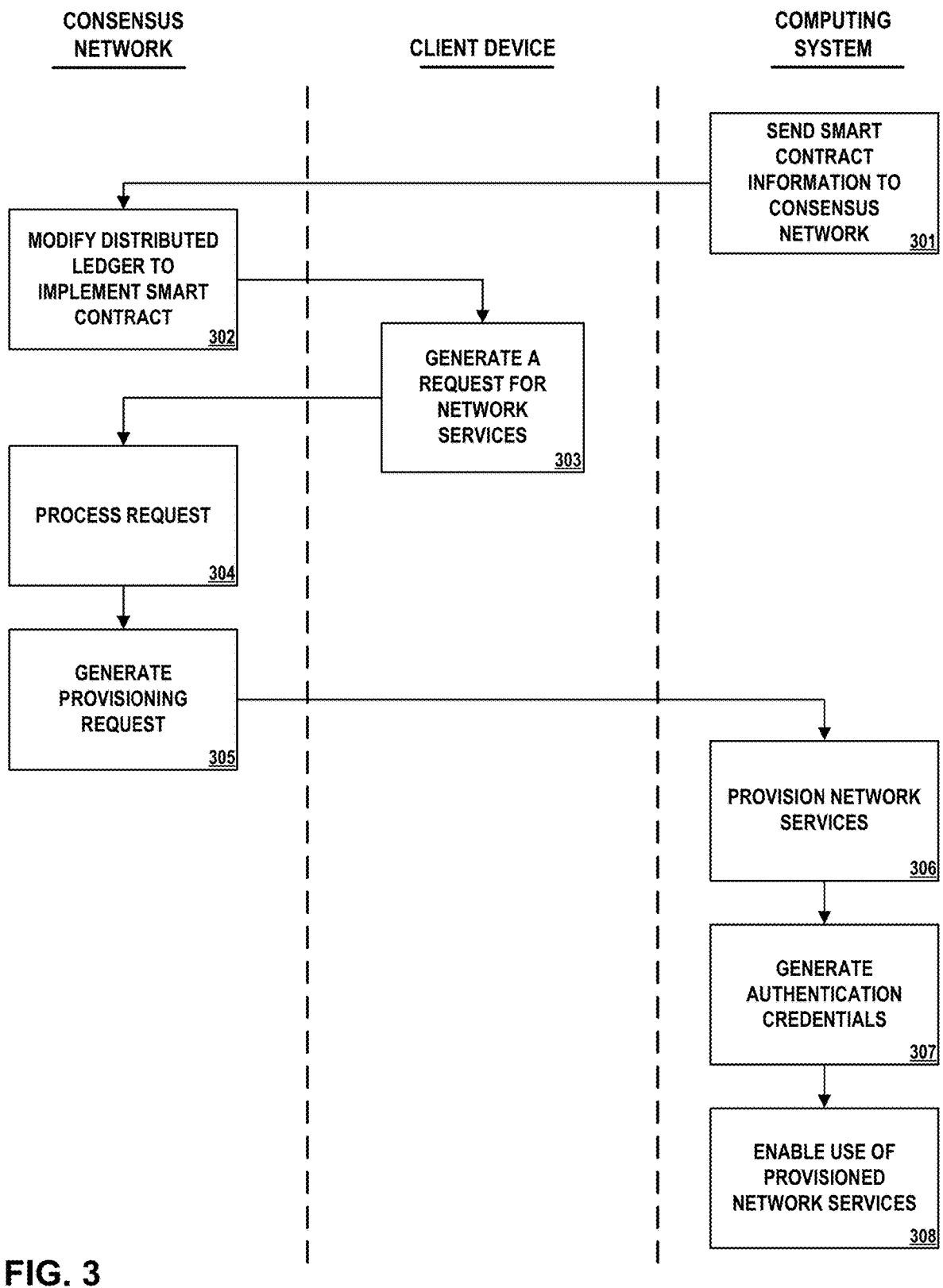
FIG. 3 is a flow diagram illustrating an example process for provisioning services using a consensus network, in accordance with one or more aspects of the present disclosure.

FIG. 3 is a flow diagram illustrating an example process for provisioning services using a consensus network, in accordance with one or more aspects of the present disclosure. The process of FIG. 3 is illustrated from three different perspectives: operations performed by an example consensus network 210 (left-hand column), operations performed by an example client device 102 (middle column between dashed lines), and operations performed by an example computing system 270 (right-hand column). In the example of FIG. 3, the illustrated process may be performed by system 200 in the context illustrated in FIG. 2. In other examples, different operations may be performed, or operations described in FIG. 3 as being performed by a particular component, module, system, and/or device may be performed by one or more other components, modules, systems, and/or devices. Further, in other examples, operations described in connection with FIG. 3 may be performed in a difference sequence, merged, omitted, or may encompass additional operations not specifically illustrated or described even where such operations are shown performed by more than one component, module, system, and/or device.

In the process illustrated in FIG. 3, and in accordance with one or more aspects of the present disclosure, computing system 270 may send smart contract information to a consensus network (301). For instance, in some examples, and with reference to FIG. 2, orchestration module 282 causes communication unit 275 to output a signal over network 105. One or more of communication units 245 within nodes 240 detect a signal, and output information about the signal to blockchain modules 251 included within each of nodes 240. Each of blockchain modules 251 determine that the signal corresponds to instructions to implement a smart contract on a distributed ledger maintained by consensus network 210. Each of blockchain modules 251 within respective nodes 240 cause nodes 240 to communicate pursuant to a consensus protocol, and determine whether the smart contract, specified by the instructions, should be included within each of ledger data stores 252.

Some or all of blockchain modules 251 within respective nodes 240 determine that the smart contract should be included within the distributed ledger maintained by consensus network 210, and some or all of nodes 240 update their respective ledger data store 252 to include information reflecting the smart contract. In this way, consensus network 210 modifies a distributed ledger to implement the smart contract (302). Computing system 270 therefore also can be considered to have modified the distributed ledger maintained by consensus network 210 to implement a smart contract, since computing system 270 sent instructions to one or more nodes 240 on consensus network 210, and thereby caused the distributed ledger maintained by consensus network 210 to be updated.

Client device 102 may generate a request for network services (303). For instance, in some examples, client device 102 detects input and outputs a signal over network 105. One or more of communication units 245 within respective nodes 240 detect a signal over network 105 and output information about the signal to blockchain modules 251. One or more of blockchain modules 251 determine that signal corresponds to transaction request 104.

Consensus network 210 may process transaction request 104 (304). For instance, in some examples, upon detecting the signal over network 105, one or more of blockchain modules 251 within nodes 240 present transaction request 104 for processing by respective smart contract modules 256 (e.g., smart contract modules 256A through 256N within nodes 240A through 240N, respectively). Some or all of smart contract modules 256, executing on at least some of nodes 240, determine that transaction request 104 corresponds to a request to provision data center resources included within or associated with data center 190.

Consensus network 210 may generate a provisioning request (305). For instance, in some examples, one or more of smart contract modules 256 cause one or more of nodes 240 to generate provisioning request 106. To do so, smart contract modules 256 cause communication units 245 within one or more of nodes 240 to output a signal corresponding to provisioning request 106 over consensus network 210 to be communicated over network 105 to computing system 270.

Computing system 270 may provision network services (306). For instance, in some examples, communication unit 275 of computing system 270 detects a signal and outputs information about the signal to orchestration module 282. Orchestration module 282 determines that the signal corresponds to provisioning request 106. Orchestration module 282 causes communication unit 275 to output a signal to one or more of data centers 190. In one example, one or more systems (or data center resources 192A within data center 190A) detect the signal. Systems within data center 190A determine resources being requested by provisioning request 106, and allocate appropriate data center resources 192A based on provisioning request 106.

Computing system 270 may generate authorization credentials to be presented in order to use the network services (307). For instance, in some examples, computing system 270 further communicates with data center 190A and/or data center resources 192A within data center 190A to configure the provisioned resources for access using authentication credentials. Computing system 270 generates and/or causes systems within data center 190A to generate authentication credentials. Computing system 270 further communicates with data center 190A to enable use of the provisioned network services by a user or system that presents the authentication credentials (308).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, a limited number of devices (e.g., nodes 140, computing system 170, nodes 240, computing system 270, data centers 190, data center networks 191, data center resources 192, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1A, FIG. 1B, and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    modifying, by a computing system, a distributed ledger maintained by a consensus network to implement a smart contract that is configured to generate, in response to receiving a request for network services, a provisioning request;
    maintaining, by the computing system, a data store of information about historical performance of each of a plurality of network service providers that are separate from the computing system;
    receiving the provisioning request, by the computing system and from at least one of a plurality of computing devices on the consensus network that is executing the smart contract, wherein the provisioning request includes information describing requested network services and information about a time period during which the requested network services are to be provisioned;
    identifying, by the computing system and based on the information about historical performance, a selected network service provider from among the plurality of network service providers that are separate from the computing system, wherein identifying the selected network service provider includes accessing the data store of information and interacting concurrently with each of the plurality of network service providers to determine, for each of the plurality of network service providers, availability and costs associated with providing the requested services;
    responsive to identifying the selected network service provider, provisioning, by the computing system and for the time period included within the provisioning request, the requested network services through the selected network service provider, wherein to provision the requested network services, the computing system interacts with a physical system in a data center associated with the selected network service provider to configure the requested network services in a network of the selected network service provider;
    generating, by the computing system, authorization credentials to be presented to the selected network service provider in order to use the network services; and
    enabling, by the computing system, use of the network services for a user that presents the authorization credentials.

2. The method of claim 1, wherein identifying the selected network service provider includes:
    interacting with a plurality of provisioning systems, each associated with one of the plurality network service providers, to determine availability and costs associated with providing the network services.

3. The method of claim 1, wherein identifying the selected network service provider includes:
    accessing the data store for information associated with each of the plurality of network service providers to determine availability and costs associated with providing services based on the information describing the requested network services.

4. The method of claim 1, wherein identifying the selected network service provider includes:
    identifying the selected network service provider further based on at least one of: availability, cost, ratings, service level offerings, or available payment methods.

5. The method of claim 1, wherein provisioning the requested network services through the selected network service provider includes:
    provisioning the requested network services on a time-limited basis based on the time period, where the time period is determined based on a payment amount.

6. The method of claim 1, wherein modifying the distributed ledger includes:
    modifying the distributed ledger to process a cryptocurrency payment in response to receiving the request for network services.

7. The method of claim 6, wherein processing the cryptocurrency payment includes:
    modifying the distributed ledger, by the smart contract executing on the consensus network, to record the cryptocurrency payment.

8. The method of claim 1, wherein receiving the provisioning request indicates that payment has been made for the requested network services.

9. A system comprising:
    a storage device; and processing circuitry having access to the storage device and configured to:
  modify a distributed ledger maintained by a consensus network to implement a smart contract that is configured to generate, in response to receiving a request for network services, a provisioning request,
  maintain a data store of information about historical performance of each of a plurality of network service providers that are separate from the computing system,
  receive the provisioning request, from at least one of a plurality of computing devices on the consensus network that is executing the smart contract, wherein the provisioning request includes information describing requested network services and information about a time period during which the requested network services are to be provisioned,
  identify, based on the information about historical performance, a selected network service provider from among the plurality of network service providers that are separate from the computing system, wherein to identify the selected network service provider, the processing circuitry is further configured to access the data store of information and interact concurrently with each of the plurality of network service providers to determine, for each of the plurality of network service providers, availability and costs associated with providing the requested services,
  responsive to identifying the selected network service provider, provision the network services through the selected network service provider for the time period included within the provisioning request by interacting with a physical system in a data center associated with the selected network service provider to configure the requested network services in a network of the selected network service provider,
  generate authorization credentials to be presented to the selected network service provider in order to use the network services, and
  enable use of the network services for a user that presents the authorization credentials.

10. The system of claim 9, wherein to identify the selected network service provider, the processing circuitry is further configured to:
  interact with a plurality of provisioning systems, each associated with one of the plurality network service providers, to determine availability and costs associated with providing network services based on the information describing the requested network services.

11. The system of claim 9, wherein to identify the selected network service provider, the processing circuitry is further configured to:
  access the data store for information associated with each of the plurality of network service providers to determine availability and costs associated with providing services based on the information describing the requested network services.

12. The system of claim 9, wherein to identify the selected network service provider, the processing circuitry is further configured to:
  identify the selected network service provider further based on at least one of: availability, cost, ratings, service level offerings, or available payment methods.

13. The system of claim 9, wherein to provision the requested network services through the selected network service provider, the processing circuitry is further configured to:
  provision the requested network services on a time-limited basis based on the time period, where the time period is determined based on a payment amount.

14. The system of claim 9, wherein to modify the distributed ledger, the processing circuitry is further configured to:
  modify the distributed ledger to process a cryptocurrency payment in response to receiving the request for network services.

15. The system of claim 14, wherein to process the cryptocurrency payment, the processing circuitry is further configured to:
  modify the distributed ledger, by the smart contract executing on the consensus network, to record the cryptocurrency payment.

16. The system of claim 9, wherein the provisioning request indicates that payment has been made for the requested network services.

17. A non-transitory computer-readable storage medium comprising instructions that, when executed, configure processing circuitry of a computing system to:
  modify a distributed ledger maintained by a consensus network to implement a smart contract that is configured to generate, in response to receiving a request for network services, a provisioning request;
  maintain a data store of information about historical performance of each of a plurality of network service providers that are separate from the computing system;
  receive the provisioning request, from at least one of a plurality of computing devices on the consensus network that is executing the smart contract, wherein the provisioning request includes information describing requested network services and information about a time period during which the requested network services are to be provisioned;
  identify, based on the information about historical performance, a selected network service provider from among the plurality of network service providers that are separate from the computing system, wherein to identify the selected network service provider, the instructions further configure the processing circuitry to access the data store of information and interact concurrently with each of the plurality of network service providers to determine, for each of the plurality of network service providers, availability and costs associated with providing the requested services;
  responsive to identifying the selected network service provider, provision the network services through the selected network service provider for the time period included within the provisioning request by interacting with a physical system in a data center associated with the selected network service provider to configure the requested network services in a network of the selected network service provider;
  generate authorization credentials to be presented to the network service provider in order to use the network services; and
  enable use of the network services for a user that presents the authorization credentials.

\* \* \* \* \*